United States Patent

[11] 3,586,350

| [72] | Inventor | Albert A. Ashton<br>Dallas, Tex. |
|---|---|---|
| [21] | Appl. No. | 827,412 |
| [22] | Filed | May 23, 1969 |
| [45] | Patented | June 22, 1971 |
| [73] | Assignee | Youngstown Sheet and Tube Company<br>Youngstown, Ohio |

[54] COUPLER
10 Claims, 13 Drawing Figs.

[52] U.S. Cl. ................................................... 285/24,
285/308, 285/320, 285/364, 285/379, 285/420
[51] Int. Cl. .................................................. F16l 35/00
[50] Field of Search............................................ 285/24, 27,
18, 308, 310, 320, 364, 420, 334.1, 379, 380,
334.2, 334.4, 223; 24/243, 248

[56] References Cited
UNITED STATES PATENTS

| 924,161 | 6/1909 | Gold | 285/380 X |
| 2,536,602 | 1/1951 | Goett | 285/364 X |
| 2,788,993 | 4/1957 | Oldham | 285/334.2 X |
| 3,321,217 | 5/1967 | Ahlstone | 285/379 X |
| 3,332,709 | 7/1967 | Kowalski | 285/379 X |
| 3,442,535 | 5/1969 | Frohlich | 285/27 |
| 3,445,127 | 5/1969 | Clarke | 285/27 X |
| 3,489,434 | 1/1970 | Haley | 285/420 X |
| 3,473,830 | 10/1969 | Haley | 285/24 |

Primary Examiner—Dave W. Arola
Attorneys—J. Vincent Martin, Joe E. Edwards and M. H. Gay ABSTRACT: This patent discloses a coupler for coupling a loading arm to a pipe flange in which jaw assemblies reach around a ship's pipe flange to engage the flange and draw the coupler into sealing engagement therewith. Provisions are made for perfecting a seal with misalignment of the coupler and the ship's manifold and for quick release of the coupler from the manifold in the event of emergency.

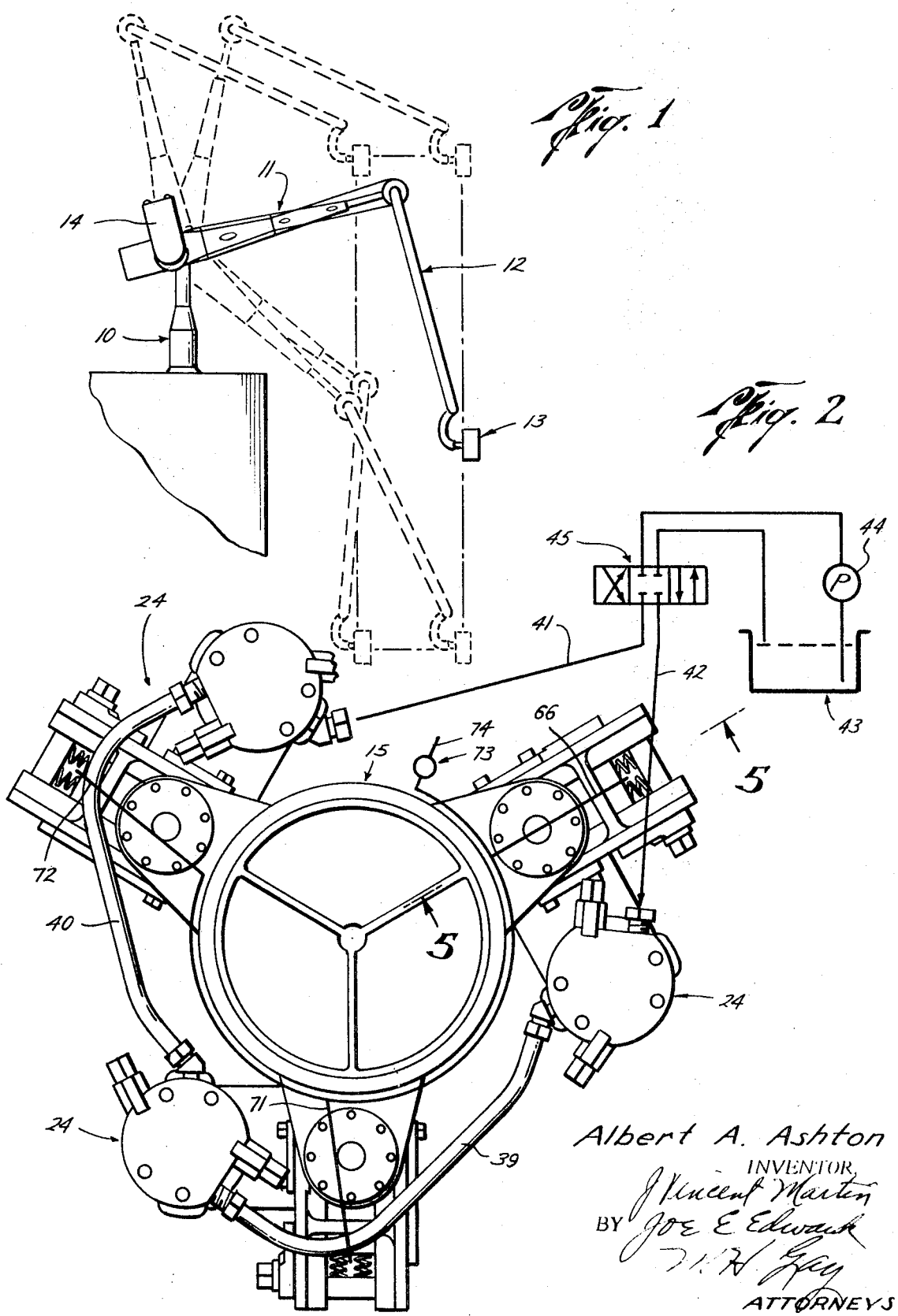

Albert A. Ashton
INVENTOR.
BY J Vincent Martin
Joe E Edwards
M K Ray
ATTORNEYS

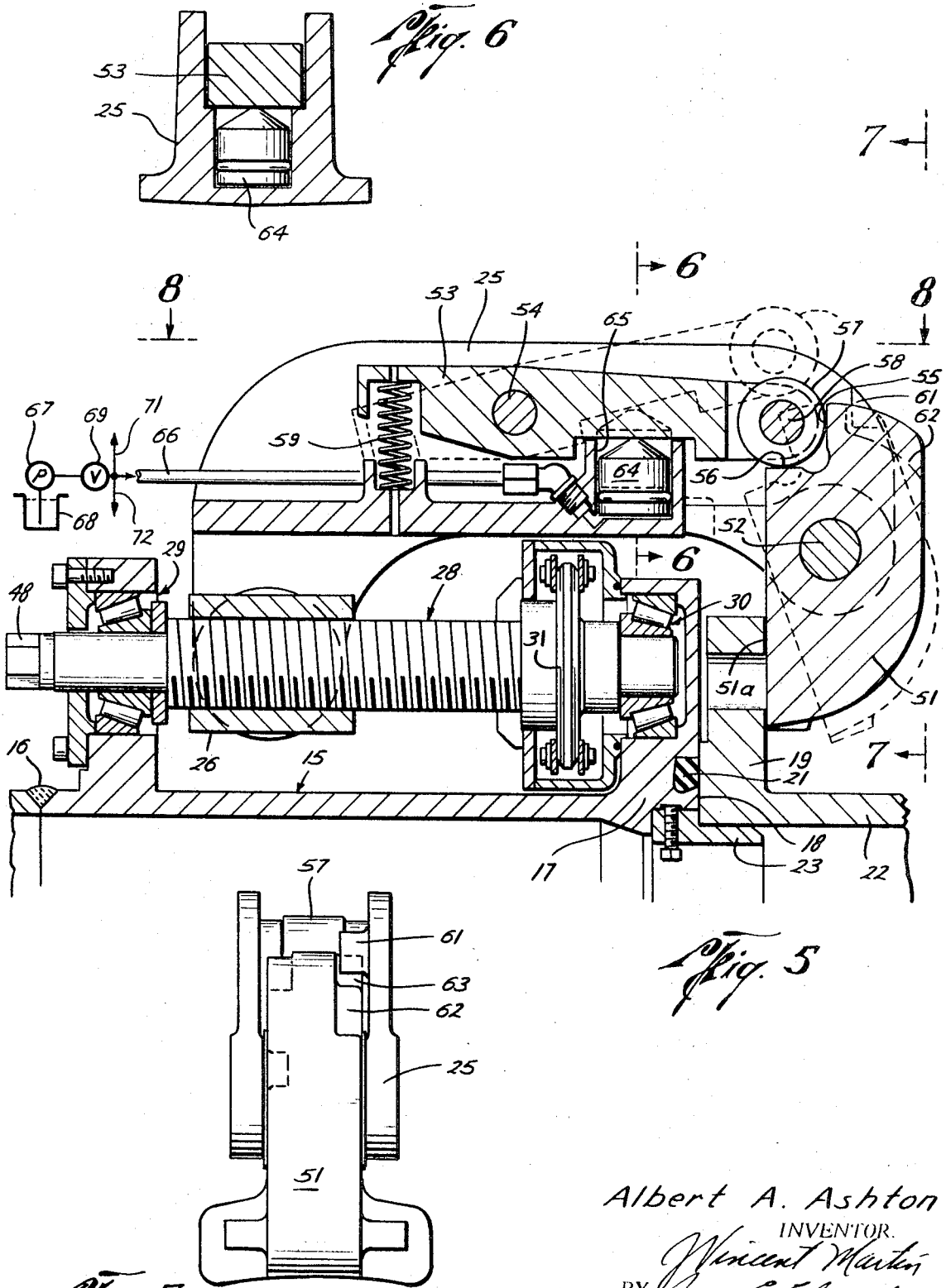

Albert A. Ashton
INVENTOR.

Albert A. Ashton
INVENTOR.

COUPLER

This invention relates to couplers and more particularly to couplers for attachment to a pipe flange.

In recent years articulating loading arms made up of pipes swiveled together have come into use for transferring fluids to and from tankers. The outboard end of the loading arm is secured to the conventional pipe flange of the ship's manifold. There is essentially no weak link in this type of loading arm, and in the event a mooring rope breaks, substantial damage to the loading arm may occur unless the loading arm can be quickly disengaged from the ship's manifold.

Hydraulically operated couplers of the type shown in copending application Ser. No. 667,716 filed Sept. 14, 1967, by Albert A. Ashton, et al. for "Loading Arm and Quick Release Coupler" may be quickly released in case of emergency if personnel are close to the controls for such coupler. The controls for such coupler will frequently be placed on shore, however, and if operators are not in immediate vicinity of the controls, damage may occur before they can be reached. It would be highly preferable to have a quick-release coupler which could be operated by ship's personnel at the ship's manifold in case of emergency.

The flange couplings of ship's manifolds are usually found to have a step in the flange face to provide a raised inner annular portion for sealing with another flange structure. In utilizing automatic couplers care must be exercised to make certain that the clamp assemblies draw the coupler to the flange uniformly. If only one clamp assembly draws the coupler tight against the flange of the ship's manifold, then this stepped face of the ship's manifold flange will permit the coupler to be tilted or misaligned relative to the ship's flange. To avoid this problem it has been proposed in the Malzard U.S. Pat. No. 1,910,706 to attach each of the couplers to a single ring gear so that they move in unison.

The Malzard solution, however, introduces a still further problem in that the thickness of pipe flanges is not necessarily uniform about the entire flange, and thus one of the clamp assemblies may engage the ship's flange before the other clamp assemblies engage. Thus uniform coupling pressure will not be present around the entire flange, and a good seal between the coupler and the ship's flange may not be obtained.

It is an object of this invention to provide an emergency release for a coupler which may be activated by ship's personnel to release the coupler in the event of an emergency.

Another object is to provide a coupler in which the clamping jaws may be quickly released to release the coupler in the event of an emergency.

Another object is to provide a coupler in which all of the clamp assembly arms are moved into position to clamp the coupler to a pipe flange in unison and in which each of the clamp assembly arms will be firmly engaged with the pipe flange notwithstanding any difference in the thickness of the pipe flange.

Another object is to provide a coupler in which the clamp arms are mechanically connected together to provide for their simultaneous movement into clamping position and in which all of the arms firmly clamp the coupler against a flange notwithstanding any differences in thickness of the flange which is engaged.

Other objects, features and advantages of this invention will be apparent from the drawings, the specification and the claims.

In the drawings wherein like numerals indicate like parts and wherein illustrative embodiments of this invention are shown, FIG. 1 is a line drawing in elevation illustrating a loading arm equipped with a coupler in accordance with this invention and illustrating in dashed lines various positions which the loading arm may assume;

FIG. 2 is a rear elevational view of a coupler constructed in accordance with this invention with the control system therefor illustrated schematically;

FIG. 5 is a view along the lines 5-5 of FIG. 2 showing in dashed lines the clamp jaw released for emergency removal of the coupler from the pipe flange;

FIG. 6 is a view along the lines 6-6 of FIG. 5;

FIG. 7 is a view along the lines 7-7 of FIG. 5;

Figure 3:
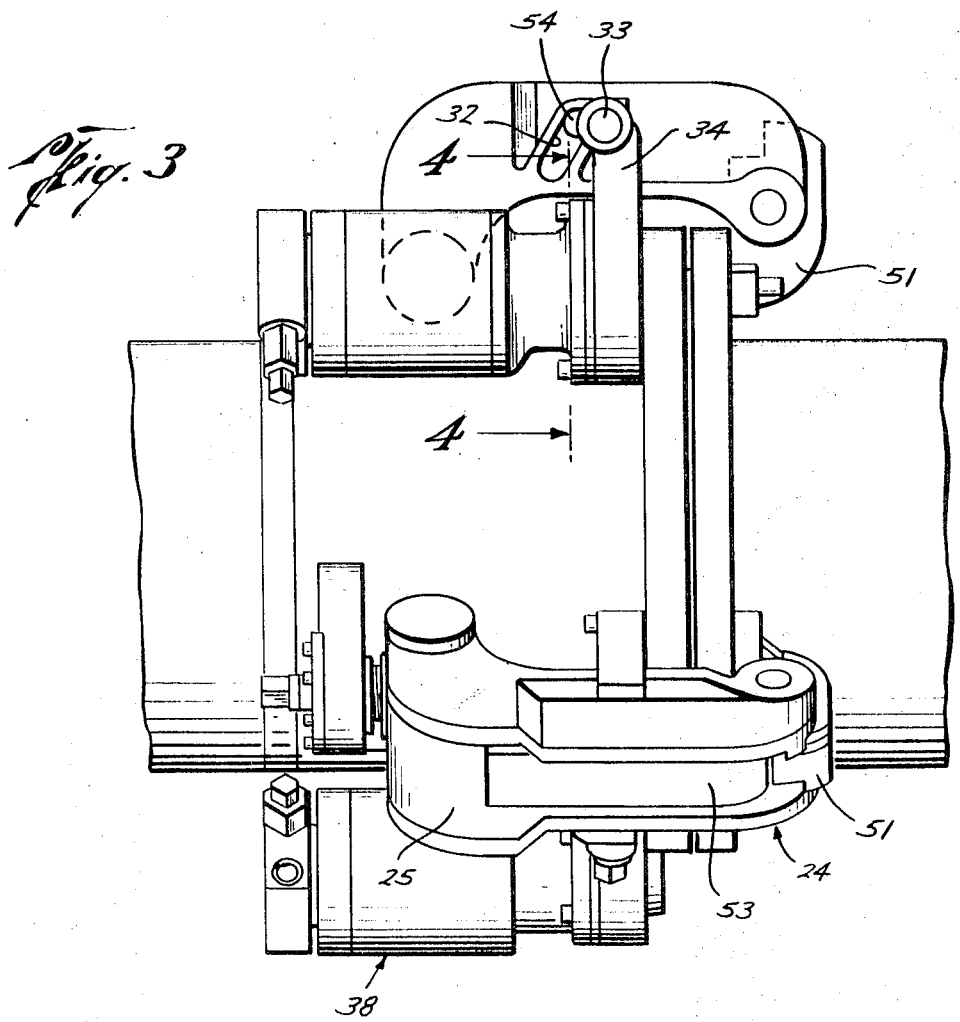
FIG. 3 is a side elevational view of the coupler of FIG. 2 attached to a pipe flange.

Referring first to FIG. 1, the loading arm illustrated includes a standard indicated generally at 10, an inboard arm indicated generally at 11 mounted on top of the standard 10 and an outboard arm indicated generally at 12 swiveled to the inboard arm. The coupler of this invention is shown generally at 13 to be positioned at the outboard end of the outboard arm.

The coupler 13 is adapted to be moved into position against a pipe flange of a ship's manifold and to quickly engage and seal with the ship's manifold for transferring fluid between the ship and shore. As shown in FIG. 1 the loading arm may be moved freely into any desired position for coupling with the ship.

The loading arm illustrated is counterbalanced by the counterbalance indicated generally at 14 and after it is coupled to the ship, the ship's manifold will normally only support a portion of the load imposed by the fluid within the arm.

The coupler 13 will normally be controlled from a console on shore so that the ship's manifold may be quickly engaged by the operator who is controlling the positioning of the arm.

Reference is now made to FIGS. 2 through 9 wherein the coupler is shown in detail.

The coupler includes a body indicated generally at 15 which is tubular in form and has a bore therethrough, approximately of the same diameter as the bore through the outboard arm 12 of the loading arm. The body 15 will normally be welded or otherwise secured to the outboard fitting of the outboard arm 12 as illustrated at 16 (FIG. 5).

The body 15 has at its end remote from the loading arm a flange 17 having an abutment face 18 for engagement with the ship's manifold pipe flange 19. A suitable seal 21 is carried by the body for sealingly engaging the ship's flange 19 to confine fluid flowing between the loading arm and the ship's pipe 22. A suitable guide 23 is carried internally of flange 17 to guide the coupler into proper position relative to the ship's pipe 22.

Figure 9:
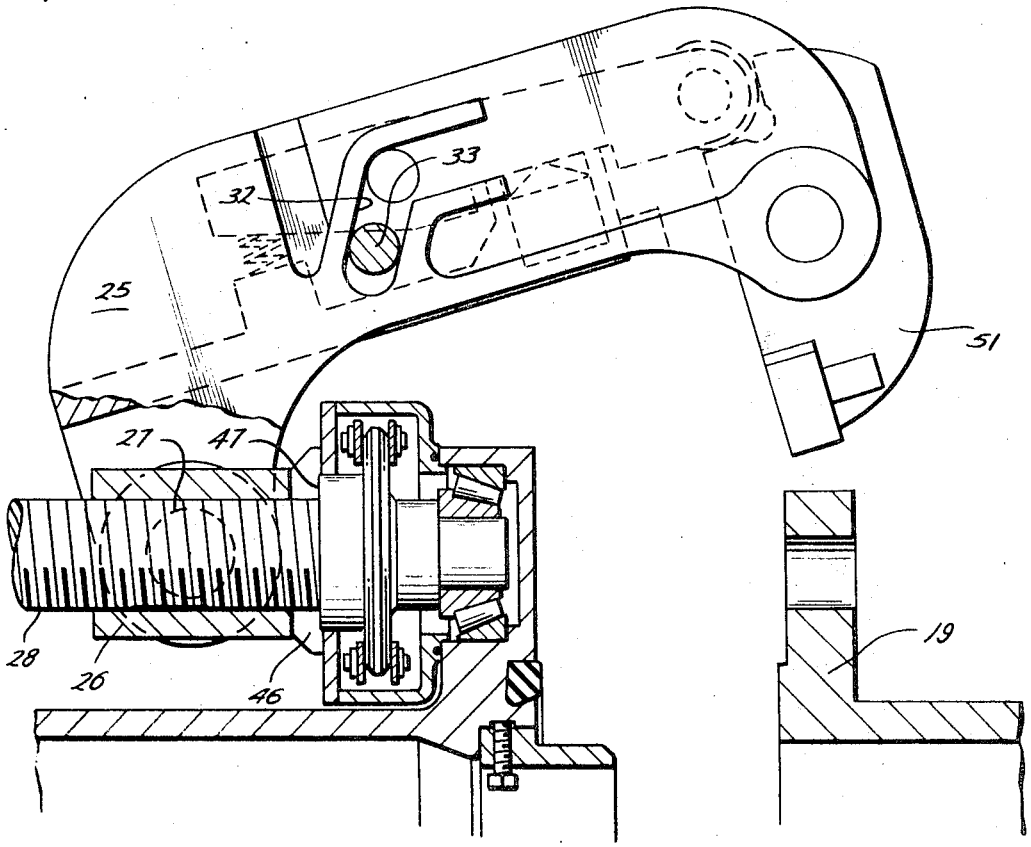
FIG. 9 is a view similar to FIG. 5 with the clamp assembly shown in elevation and in a position disengaged from the flange.

After the operator has maneuvered the arm and coupler into position where the coupler flange 17 and the ship's flange 19 are in abutment, the several clamp arm assemblies are operated to move from the position shown in FIG. 9 to the position shown in solid lines in FIG. 5 to firmly clamp the coupler to the ship's flange.

As shown in FIG. 2, there may be three or more of the clamp assemblies indicated generally at 24. For large diameter loading arms, such as 16-inch diameter arms, as many as five of the clamp assemblies may be utilized.

Each clamp assembly includes a clamp arm 25 which is pivotally mounted on a nut 26. The pivot is shown in dashed lines at 27 (FIG. 9).

The nut 26 is carried on the screw assembly which includes a screw 28 on which the nut 26 is mounted, suitable support bearings indicated generally at 29 and 30 at opposite ends of the screw and a drive sprocket 31 for driving the screw.

The desired longitudinal and radial movement of the clamp arm is controlled by the cooperation of a conventional, angled slot 32 and pin 33 carried in a standard 34 on the body (FIG.

3). As the screw 28 is rotated, the movement of the nut 26 along the screw shifts the clamp arm longitudinally. The angled track 32 controls the direction of travel of the free end of the arm. Thus with the arm in the engaging or disengaging position shown in FIG. 9, movement of the nut toward the loading arm will first provide substantially large radial movement of the free end of the arm inwardly into clamping position with slight movement longitudinally of the coupler toward coupling position. As soon as the slot has moved downwardly relative to the pin to the apex of the angle, the slot is parallel to the central axis of the body 15 and further movement of the nut moves the arm 25 longitudinally of the body until the clamp arm is in the position shown in FIGS. 3 and 5 in which the clamp assemblies engage the ship's flange and hold the coupler in sealing engagement therewith. The screw and nut provide a self-locking assembly and hold the clamp arms in locked position.

Figure 4:
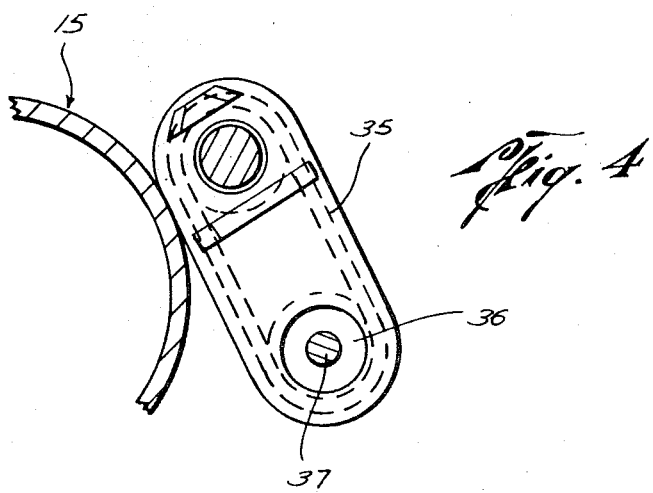
FIG. 4 is a view along the lines 4-4 of FIG. 3.
Figure 8:
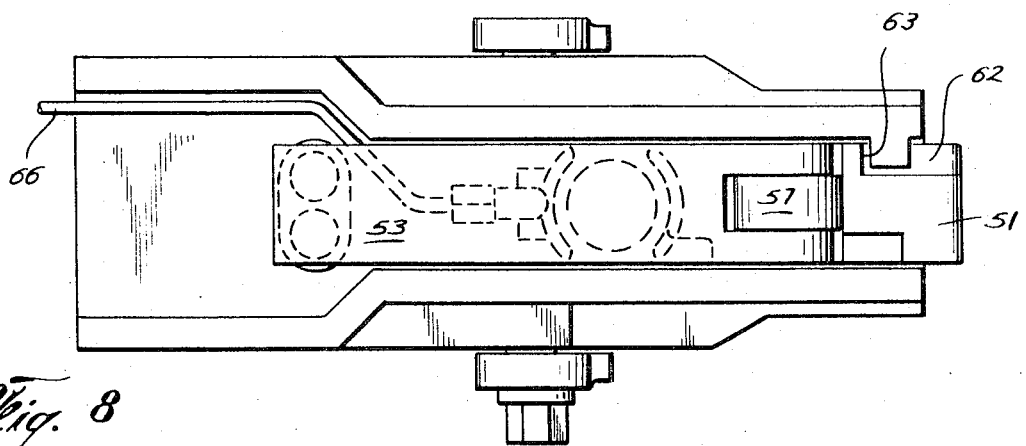
FIG. 8 is a view along the lines 8-8 of FIG. 5.

In order to rotate the screw 28, the sprocket 31 is driven by a suitable chain 35 shown in dashed lines in FIG. 4. The chain is in turn driven by a sprocket 36 mounted on the arbor 37 of drive motor indicated generally at 38.

Referring now to FIG. 2, it will be noted that the drive motors are fluid connected through conduits 39 and 40. Fluid is provided for driving the motors in a selected direction to move the screw 26 in either direction through lines 41 and 42. Fluid is provided from a suitable source indicated generally at 43 and fed under pressure to the motors by the pump 44. A suitable valve indicated schematically at 45 may be positioned to isolate the pump fluid from the motors or to provide fluid flow in either direction through lines 41 and 42.

The fluid motors are of the positive displacement rotary type and are provided with overload valves set at a selected pressure such that once each motor stalls, fluid will be bypassed while holding the selected pressure on the motor. Fluid is successively fed through the three motors which are in turn operated simultaneously until a back pressure of the desired level is built up, whereupon fluid is bypassed.

It might be noted that in moving to retracted position, the nut 26 comes into engagement with stop 46 as shown in FIG. 9 which prevents the nut from engaging the shoulder 47 on the screw with which it might gall as shoulder 47 is rotating. A similar stop, not shown, is positioned on the opposite side of the screw 28 from the stop shown. Also, it might be noted that the free end of the screw is provided with flats 48 to permit the screw to be rotated with a hand wrench in case of loss of power.

In order to provide for emergency release of the coupler from the ship, the clamp assembly is so constructed that the clamp jaw 51 which engages the ship'flange 19 may be released without moving the clamp arm 25.

For this purpose the clamp jaw 51 is pivotally mounted on the clamp arm 25 by pivot 52.

Means are provided for holding the clamp jaw in fixed position relative to the clamp arm during normal operation of the coupler. This holding means includes lever 53 which is mounted on the clamp arm 25 by pivot 54. The lever 53 engages the jaw 51 and holds it in the normal operative position. Preferably, the jaw 51 on the side of the pivot 52 from the flange engaging portion 51a of the jaw has a notch therein for engagement by the lever 53 to hold the jaw 51 in engagement with the ship's flange when the clamp assembly is energized to secure the coupler to the flange. In the form illustrated, the jaw is notched out to provide angular surfaces 55 and 56. These surfaces preferably extend at right angles to each other. The notch is engaged by a roller 57 pivoted on the end of arm 53 by suitable pivot 58. Thus, with the lever in the solid-line position shown in FIG. 5, the roller 57 engages notch surface 55 to limit rotational movement of the jaw 51 about its pivot. The roller also engages surface 56 to limit downward movement of the arm 53 and hold it in the proper position.

The lever is urged toward the solid-line position shown in FIG. 5 by a plurality of springs 59.

It is preferable to also prevent rotation of the jaw 51 in the other direction during normal use of the coupler, and for this purpose the clamp arm 25 has a projection 61 which extends into a slot 62 on the top side of jaw 51 as viewed in FIGS. 5 and 7. The protrusion 61 engages surface 63 of the slot to prevent movement of the jaw in a clockwise direction about pivot 52 as viewed in FIG. 5. The slot 62 is contoured as shown in FIG. 5 to the extent necessary to prevent the protrusion 61 from interfering with free counterclockwise rotation of the clamp jaw 51 through at least 90° of rotation.

Means are provided for selectively releasing the holding means provided by the arm 53 to permit the jaw 51 to swing about its pivotal mounting 52. In the preferred form a piston 64 is provided in cylinder 65. The cylinder 65 is open at its upper end and underlies the arm 53.

Fluid is fed to the space in the cylinder below the piston 64 through conduit 66 to raise the piston 64 forcing arm 53 to rotate in a counterclockwise direction as viewed in FIG. 5 against the force of springs 59 to raise the roller 57 to the dotted line position shown. This disengages the jaw 51, permitting it to rotate as indicated in dotted lines to disengage the ship's flange.

A suitable source of pressure fluid is utilized to move the piston 64. Preferably, each of the clamp assemblies is provided with the quick-release feature, and a pump 67 preferably located on the body 15 is utilized to supply pressure fluid from source 68 through the valve 69, lines 66, 71 and 72 to the three clamp assemblies.

The preferred form of pump for activating the release means is a simple manually operated grease gun indicated generally at 73 in FIG. 2. Operation of the handle 74 of the grease gun will pump grease through the conduits 66, 71 and 72 to the three clamp assemblies to release the holding means, permit the jaws 51 to swing about their pivots and the coupler to be disengaged from the ship's flange no matter what the emergency conditions may be. Even if the ship is swinging away from the dock and imposing substantial loads on the loading arm, the substantially frictionless contact provided between the jaw and roller 57 will permit the grease gun to supply sufficient fluid under pressure to overcome the springs 59 and release the holding means. Of course, if desired any other type of fluid under pressure supplied by a pump or stored and controlled by a valve or the like may be utilized to release the holding means. It is also apparent that the pressure for releasing the holding means could readily be supplied from the pump 44 or any other desired means, either on board ship or on shore.

Figure 10:
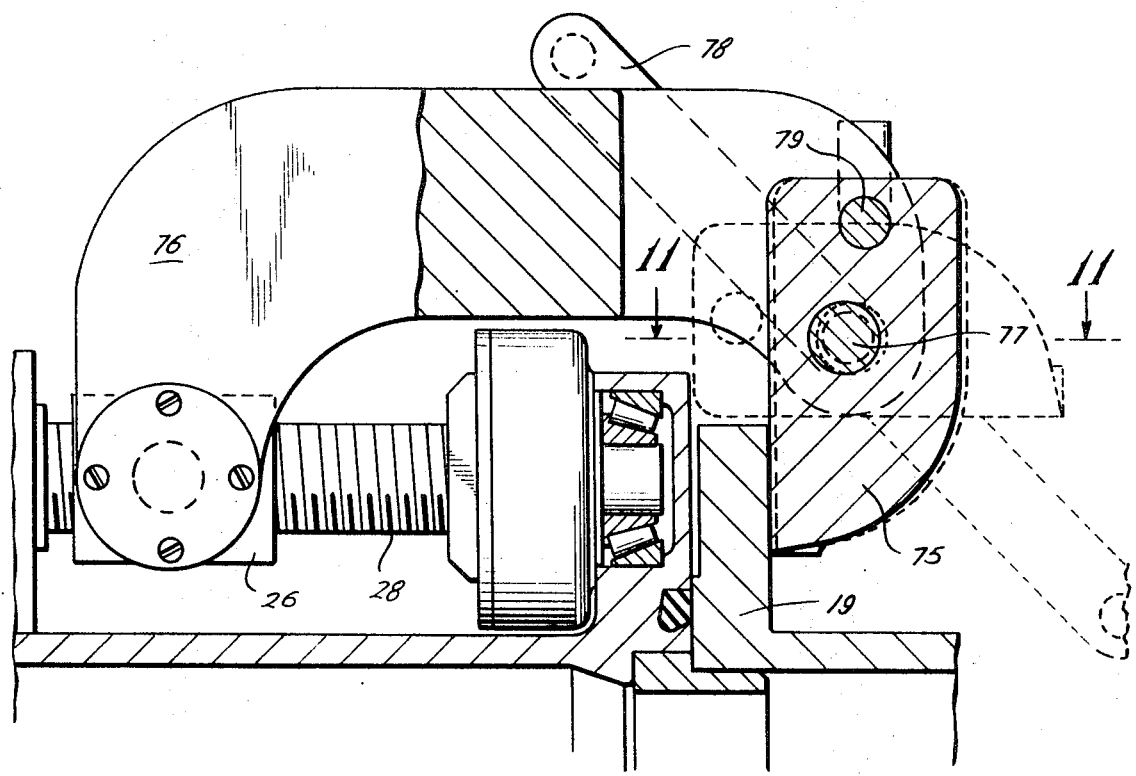
FIG. 10 is a view partially in elevation and partially in cross section illustrating a modified form of this invention.
Figure 11:
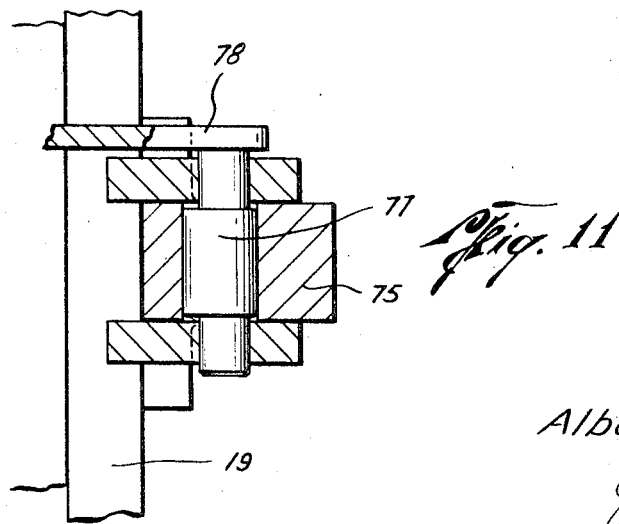
FIG. 11 is a view along the lines 11-11 of FIG. 10.

Reference is now made to FIGS. 10 and 11 wherein an alternate form of safety release is illustrated. In this form of the invention, the clamp jaw 75 is moved a slight distance away from the ship's flange 19, and then a pin is removed to permit the jaw to freely turn to an out-of-the-way position.

The clamp arm 76 is mounted on nut 26, and the nut is reciprocated in the same manner as hereinbefore explained.

At the free end of the clamp arm 76 the clamp jaw 75 is mounted on the clamp arm by an eccentric pivot 77. This pivot is attached to an arm 78 for swinging the eccentric to move the jaw out of engagement with the ship's flange when the arm is swung to the dotted line position. From FIG. 11, it will be noted that the eccentric in the normal operating position of the parts has its lobe on the flange side of the axis of rotation of the pivot 77. Upon rotation of the eccentric 77 through 180°, the lobe will be away from the flange and thus move the jaw away from the flange.

With the force on the jaw relieved, the pin 79 which extends through the jaw and arm 76 to normally pin it in position may be withdrawn to permit the jaw to freely turn about the eccentric to an out-of-the-way position as shown in dotted lines in FIG. 10 to permit emergency disconnection of the coupler from the ship's flange.

Figure 12:
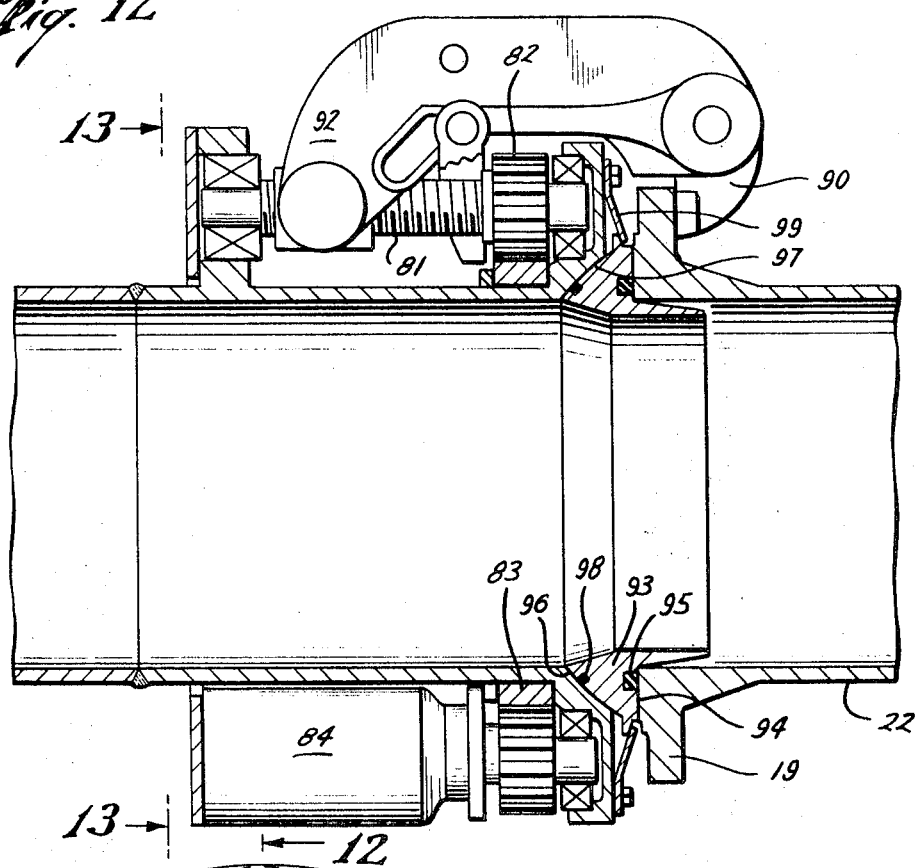
FIG. 12 is a view partially in elevation and partially in vertical cross section with parts broken away showing another modified form of this invention; and, FIG. 13 is a view along the lines 13-13 of FIG. 12.
Figure 13:
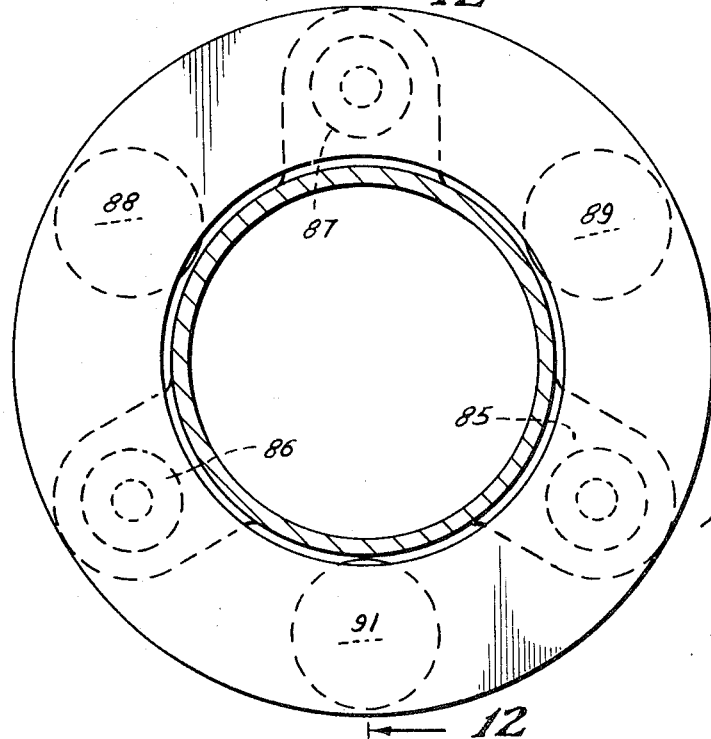

Reference is now made to FIGS. 12 and 13 in which a still further alternative form of this invention is shown. In order to rotate the several screws 81 in unison, each screw is provided with a pinion 82 which is driven by ring gear 83. The ring gear may be driven by one or more motors 84. In FIG. 13 a form is shown in which three clamping assemblies 85, 86 and 87 are driven by the three motors 88, 89 and 91. If desired, any number of motors could be utilized. It will also be apparent that a chain drive could be substituted for the ring gear to drive the several screws 81 in unison.

The clamp assemblies include the clamp arm 92 which is slightly different in configuration but operates in the same manner as hereinbefore explained with the clamp jaw 90 being releasable in emergency situations as hereinbefore explained in conjunction with FIGS. 1 through 9.

With the three clamp assemblies being driven simultaneously from a single ring gear, it will be appreciated that any difference in thickness of the ship's flange 19 from point to point about the pipe 22 will result in one of the clamp assemblies exerting more force than the others. Also, tolerances might cause one clamp assembly to be effective before the other assemblies. Thus, one assembly could be under substantial strain while the other assemblies are under little or no strain, and leakage past the seal might occur in the area of the loose clamp assemblies.

In order to permit the use of clamp assemblies positively and mechanically ganged together and provide that all clamp the ship's flange with equal force, a floating seat is provided which will misalign relative to the body of the coupler as the clamp assemblies pull the coupler into firm engagement with the ship's flange and evenly distribute the load between the several clamp assemblies.

The floating seat illustrated at 93 has a flat surface 94 for engagement with the ship's flange and a suitable seal 95 therein for sealing with the ship's flange.

The opposite face 96 of the floating seal cooperates with a body seat surface 97 in a manner to permit relative misalignment between the floating seat and the body. Preferably, the floating seat surface 96 and body seat surface 97 are semihemispherical about a center which lies on the central axis of the coupler and outside of the free end of the coupler or to the right thereof as viewed in FIG. 12. With this arrangement pressure on one side of the seat which is not opposed by corresponding pressure will cause the floating seat to rotate within the body seat in the manner of a ball to compensate for tolerances and for difference in thickness of the ship's flange about the pipe so that the forces exerted by the several clamp assemblies will be substantially equal.

While mating semihemispherical surfaces on the body and floating seat are preferred, it will be apparent that any relationship of seat surfaces other than mating frustoconical surfaces and a pair of mating surfaces which are exactly opposite to those shown could be utilized. By exactly opposite to those shown is meant seat surfaces which, when viewed in cross section, are concave on the seat insert and convex on the body and thus are formed about centers which lie outside of the coupler and on the loading arm side of the seat surface. As such surfaces would be concave on the seat insert and convex on the body, they would not be permitted to misalign relative to each other. In like manner frustoconical surfaces would not permit misalignment. All other relationships of surfaces would permit misalignment. For instance, the convex surface on the floating seat insert illustrated could be utilized with a frustoconical surface substituted for the body surface 97 and permit misalignment. In like manner, confronting convex surfaces on each member could be utilized. A convex surface could be utilized on the body surface cooperating with a frustoconical surface on the seat insert.

The mating semihemispherical surface is preferred, particularly for high pressures as a firm contact between the metal-to-metal seat surfaces 96 and 97 will be provided which will confine the resilient seal material 98 and prevent leakage. However, it will be apparent that the slight misalignment needed to compensate for the flange width and tolerances would not require a great deal of misalignment, and a suitable seal could be obtained with other surface configurations, particularly under relatively low-pressure conditions.

The floating seat is held in position by a plurality of finger-like retainers 99 carried by the body which may be leaf springs to firmly hold the floating seat in position.

From the above it will be seen that the problems referred to hereinabove of the prior couplers have been solved, and all of the objects of this invention have been attained. The releasable jaws 93 have been shown to be releasable either by a fluid system or mechanically. It is obvious from the above disclosure that the clamping jaws could be released electrically by substituting solenoids for pistons 64 and operating such solenoids from any desired source of current.

The foregoing disclosure and description of the invention are illustrative and explanatory thereof and various changes in the size, shape and materials, as well as in the details of the illustrated construction, may be made within the scope of the appended claims without departing from the spirit of the invention.

What I claim is:

1. A coupler comprising,
   a body,
   a plurality of clamp assemblies on said body for releasably securing said coupler to a pipe flange,
   at least one of said clamp assemblies comprising,
   a clamp arm,
   a clamp jaw,
   eccentric means pivotally mounting said clamp jaw on said clamp arm,
   removable pivot means pivotally mounting said clamp jaw on said clamp arm and spaced from and cooperable with said eccentric means for holding said clamp jaw in fixed relationship with said clamp arm,
   means for moving said eccentric means to pivot said clamp jaw about said removable pivot means relative to said clamp arm to disengage the clamp jaw from the pipe flange to permit removal of said removable pivot means and rotation of the clamp jaw about the eccentric means into a position for disengagement of the coupler from the pipe flange.

2. A coupler comprising,
   a body,
   a plurality of clamp assemblies,
   means for moving the clamp assemblies between a position to engage a pipe flange to clamp the coupler thereto and a position clearing the pipe flange to permit the coupler to be moved into and out of engagement with the pipe flange,
   each of said clamp assemblies comprising,
   a clamp arm,
   a clamp jaw pivotally mounted on said clamp arm,
   means for holding said clamp jaw in fixed position relative to said clamp arm, and
   means for selectively and substantially simultaneously releasing said holding means on each clamp assembly permitting said jaws to swing about said pivotal mountings,
   said means for selectively substantially simultaneously releasing said holding means being independent of said means for moving the clamp assemblies between engaging and out-of-engagement position.

3. The coupler of claim 2 wherein said jaws when released are free to swing to an out-of-the-way position in which the clamp jaws will not interfere with disengagement of the coupler from the flange without movement of the clamp arm.

4. The coupler of claim 2 wherein said means for selectively substantially simultaneously releasing said holding means are hydraulic means.

5. The coupler of claim 4 wherein said hydraulic means include a manually operated pump.

6. A coupler comprising,
   a body,
   a plurality of clamp assemblies on said body for releasably securing said coupler to a pipe flange,
   means for moving said clamp assemblies between a position engaging said pipe flange and an out-of-engagement position,
   each of said clamp assemblies comprising, a clamp arm,
a clamp jaw,
pivotal means for mounting said clamp jaw on said clamp arm,
a lever pivotally mounted on said clamp arm and selectively preventing rotation of said clamp jaw about said pivot means when in a holding position, and
means for selectively and substantially simultaneously moving each of said levers out of said holding position to permit said clamp jaws to rotate about said pivot means into an out-of-the way position in which said clamp jaws will not interfere with disengagement of said coupler from said pipe flange,
said means for selectively substantially simultaneously releasing said holding means being independent of said means for moving the clamp assemblies between engaging and out-of-engagement positions.

7. The coupler of claim 6 wherein means are provided which cooperate with said lever to prevent rotation of said clamp jaw about said pivot means in either direction.

8. The coupler of claim 6 wherein antifriction engagement means are provided on said lever for engaging said clamp jaw.

9. The coupler of claim 6 wherein said means for selectively substantially simultaneously releasing said holding means are hydraulic means.

10. A coupler comprising,
a body,
a flowway through said body,
a seat at one end of the body surrounding said flowway,
a floating seat cooperable with said body seat and a pipe flange to which the coupler is connected to seal therebetween while permitting misalignment of said body and pipe flange,
means for maintaining said floating seat in engagement with said body seat,
a plurality of clamp assemblies on said body for releasably securing said coupler to said pipe flange,
hydraulically actuated means for moving said clamp assemblies between a position engaging said pipe flange and an out-of-engagement position,
each of said clamp assemblies comprising,
a clamp arm,
a clamp jaw,
pivotal means for mounting said clamp jaw on said clamp arm,
a lever pivotally mounted on said clamp arm and selectively preventing rotation of said clamp jaw about said pivot means when in a holding position; and
hydraulically actuated means for substantially simultaneously moving each of said levers out of said holding position to permit said clamp jaws to rotate about said pivot means into an out-of-the way position permitting disengagement of said coupler from said pipe flange without movement of said clamp arm;
said means for substantially simultaneously moving said levers out of said holding position and said means for moving said clamp assemblies between engaging and out-of-engagement positions having independent hydraulic systems.